United States Patent [19]

Oliwa et al.

[11] Patent Number: 4,856,088
[45] Date of Patent: Aug. 8, 1989

[54] RADIO WITH REMOVABLE DISPLAY

[75] Inventors: Gary A. Oliwa, Boynton Beach; Marilyn S. Burger, Pompano Beach, both of Fla.

[73] Assignee: Motorola, Inc., Schaumburg, Ill.

[21] Appl. No.: 143,783

[22] Filed: Jan. 14, 1988

[51] Int. Cl.$^4$ .......................... H04B 1/08; H04Q 1/02
[52] U.S. Cl. ................................. 455/349; 455/351; 340/825.44; 340/311.1
[58] Field of Search ............... 455/349, 347, 348, 351, 455/158, 145, 90, 89; 340/825.44, 311.1

[56] References Cited

U.S. PATENT DOCUMENTS

| | | | |
|---|---|---|---|
| 3,970,782 | 7/1976 | Fenne | 455/349 X |
| 4,231,115 | 10/1980 | Henderson et al. | 455/349 X |
| 4,478,521 | 10/1984 | Evans et al. | |
| 4,578,739 | 3/1986 | McKee et al. | |
| 4,704,740 | 11/1987 | McKee et al. | 455/348 |

*Primary Examiner*—Robert L. Griffin
*Assistant Examiner*—Ralph E. Smith
*Attorney, Agent, or Firm*—William E. Zitelli; Vincent B. Ingrassia

[57] ABSTRACT

An electronic device having a display is disclosed which comprises contacts for electrically coupling the display to the circuitry of the electronic device, and a mounting arrangement for removable attachment of the display to the electronic device, such that the display may be removed from the electronic device to be read. The electronic device may be a radio transceiver, and the display may be adapted to display a paging message from a paging receiver associated therewith.

10 Claims, 2 Drawing Sheets

RADIO WITH REMOVABLE DISPLAY

FIELD OF THE INVENTION

This invention relates to electronics displays, and more particularly, to electronic displays associated with display paging receivers, especially when the paging receiver is incorporated within another device such as a radio receiver or a two-way radio transceiver.

BACKGROUND OF THE INVENTION

Display paging receivers are now well known. Such receivers generally comprise electronic circuitry for decoding an address message transmitted over the air, and upon receipt of a particular address, associated electronic circuitry accepts a following message intended for the user of the paging unit. The message is stored in a memory of the unit ad may be displayed on an appropriate display, such as an LCD display, for the use to read either at the time of the page or later.

In many other radio or other electronic devices, it would be desirable to have available for use a paging function or activity. For example, two-way radio transceivers of either the portable type (e.g. those carried in the hand or worn on a belt) or the mobile type (e.g. those mounted in a vehicle, for example, in or under the dashboard) already have substantial portions of the electronics associated with them that are necessary to provide the paging function.

Paging devices typically have not been provided with such radio, however, for a number of reasons, at least one of which being that the display of a radio so carried or mounted, is typically not in the user's field of view and is difficult or impossible for a user to read without changing the position of the radio or the user. In the case of a vehicle-mounted radio, such a change of position may even be dangerous. Thus, it would be highly desirable to provide a detachable display for the paging devices.

Previous detachable displays have typically been used to prevent unauthorized reading of the display. Such a detachable display is disclosed in U.S. Pat. No. 4,478,521 to Evans. In this device, the detachable display is used to prevent unauthorized reading and not to enhance the user's view.

OBJECTS AND SUMMARY OF THE INVENTION

Accordingly, it is an object of the instant invention to provide a paging device with a display module which is removable from its associated electronic devices for purposes of convenient viewing.

It is a further object of the instant invention to provide a radio unit which is capable of performing a paging function having a display module which is removable from the radio unit.

The foregoing objects are accomplished by providing an electronic device having a display in the form of a display module, comprising means for electrically coupling the display to the circuitry of the electronic device, and means for the removable attachment of the display module to the electronic device such that the display module may be removed from the electronic device to be read.

DETAILED DESCRIPTION OF A PREFERRED EMBODIMENT

Figure 1:
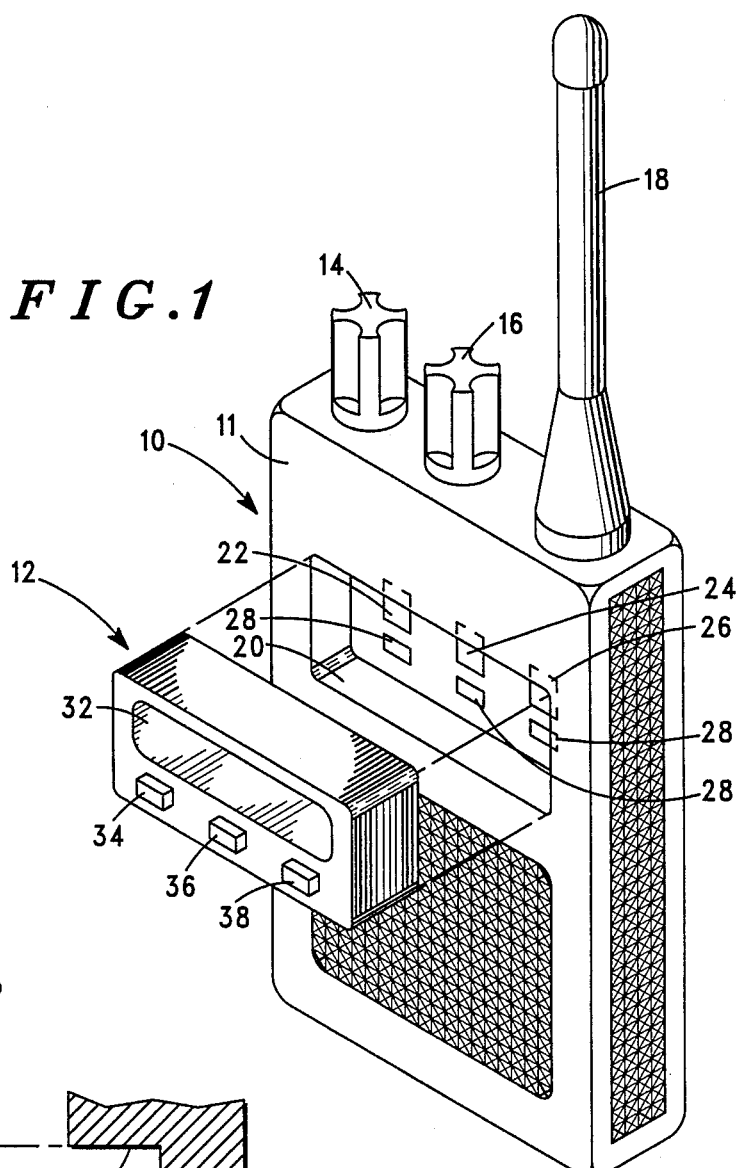
FIG. 1 shows a representation of a portable type fradio transceiver with a removable display module in accordance with the instant invention.

FIG. 1 shows a representation of a portable type radio transceiver 10 having an enclosure 11 for containing the circuitry thereof and a removable display module 12 in accordance with the instant invention. The portable radio transceiver has associated with it the ordinary controls 14, 16 of such a device, and antenna 18.

In a preferred embodiment of the invention, a recess 20 is provided in the enclosure 11 in which one or more contacts 22, 24, 26 are mounted. Behind one or more of these contacts are magnets which will be used to secure the display module 12 to the enclosure 11 within the recess 20. Also within the recess 20 may be, if necessary, a plurality of additional electrical contact 28. Associated with the display module 12 are a display element 32 which may be, for example, an alphanumeric LCD display, and a plurality of buttons 34, 36, 38 which are conventionally used in a paging apparatus to operate a light or the display itself, or to step through a message received by the pager or other information.

On the rear of the display module 12 are electrical contacts corresponding to the contacts 22, 24, 26, 28 of the transceiver 10 through which electrical signals may be passed while the display is in its normal position within the recess 20.

Figure 2:
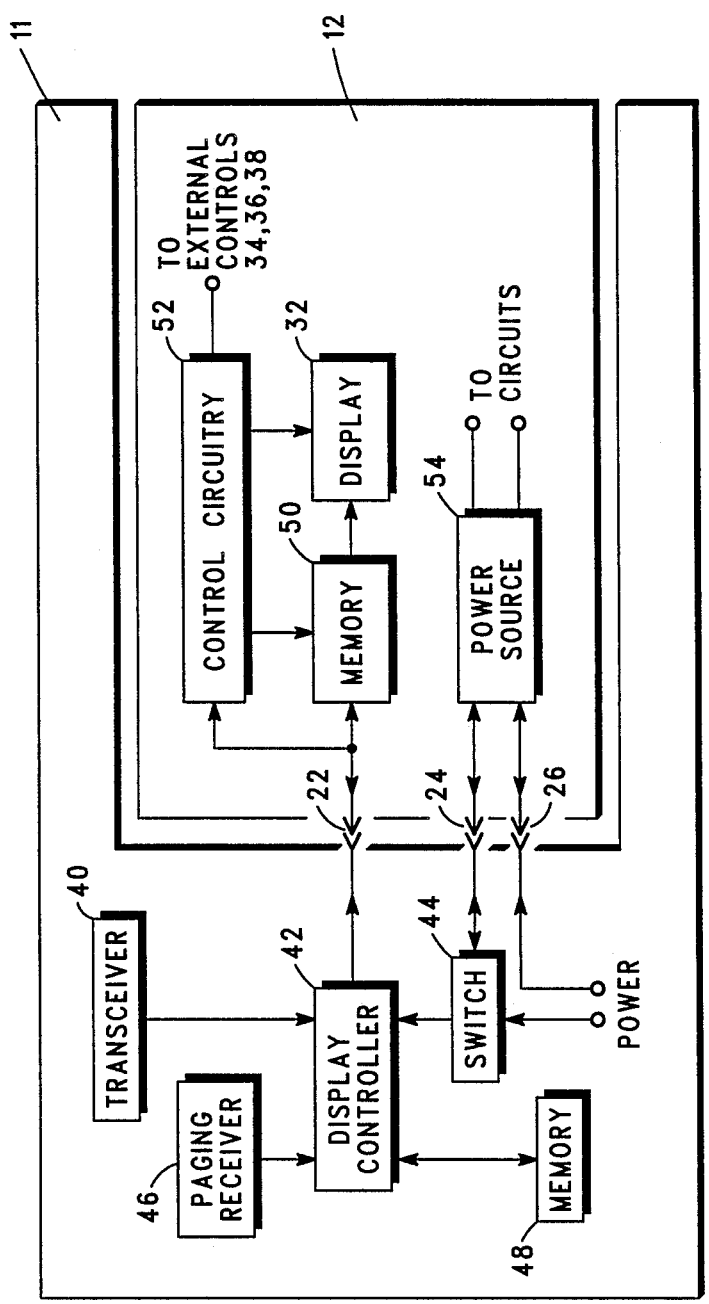
FIG. 2 shows, in block diagramform, a radio unit with a removable display module in accordance with the instant invention.

FIG. 2 shows, in block diagram form, the radio unit enclosure 11 with removable display module 12. The host radio unit 10 typically comprises a transceiver portion 40 which performs the RF operations of the radio. Coupled to the transceiver 40 is a display controller 42 for driving the display 32 to display information associated with the operation of the radio itself, such as frequency or channel, status, etc., or paging messages. Coupled to the display controller 42 is a switch or sensor 44 which comprises a means for sensing, through contact 24, whether the display module 12 is connected to the radio 10. When the module 12 is so connected, the module display 32 ordinarily displays radio data. When disconnected, or upon command, the display 32 ordinarily displays paging data.

Mounted within the host radio's body 11 is the circuitry of a paging receiver 46 which may use some of the circuitry of the transceiver 40. Coupled to the paging receiver 46 through display controller 42 is a memory 48 for storing display data from either the paging receiver 46 or the transceiver 40. The display controller 42 is coupled to one of the electrical contacts 22 to couple the display controller 42 to the display module 12.

The display module 12 comprises a display 32 and a memory 50 which stores a message or other data to be displayed when the display module 12 is removed from the radio 10. Coupled to the memory 50 and the display 32 is control circuitry 52 which controls the display in a conventional manner and also provides a coupling to the control buttons 34, 36, 38 in a conventional manner. A low capacity rechargeable power source 54 is provided within the display module 12 for providing power to the circuitry and display of the module when the module is disconnected from the radio.

Figure 3:
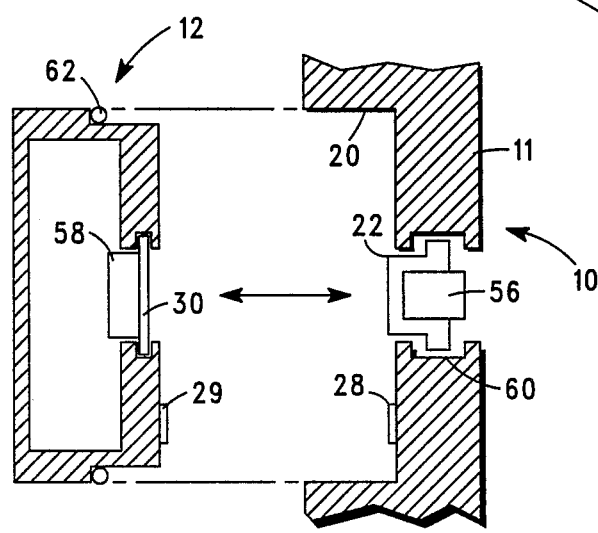
FIG. 3 shows a preferred method of securing the display module within the radio unit.

FIG. 3 shows a preferred method of securing the display module 12 within the recess 20 of the radio unit 10. Within the recess 20 is shown in side view one of the contacts 22 through which the display module communicates with the radio unit when the module is fixed within the radio housing. Behind the contact 22 is a magnet 56 which will attract a similar magnet 58 of opposite polarity within the display module. Alternatively, if a sufficient attractive force to securely hold the module in place exists, one of the magnets may be replaced with any ferromagnetic material.

The contact 22 is retained within the radio by a slot or groove 60 into which a lip on the contact is engaged. The groove may be slightly oversized in order to allow for slight lateral movement to insure complete surface-to-surface contact with a mating contact 30 on the display module. As can be seen in FIG. 3, a sealing ring 62 may also be provided in protect against water leakage.

The additional contacts 28 are shown in FIG. 3 as is a mating contact 29 for contact 28.

It can be seen that the magnetic attachment method described provides secure mounting as well as good electrical contact between the display module 12 and the radio 10 with minimum mechanical parts.

In ordinary operation of the radio unit, the display 32 is coupled through display controller 42 to the transceiver to display common radio data. The data to be displayed is first placed by the display controller 42 into memory 48. The same data is also copied into memory 50 through display controller 32 so that as long as the display module 12 is in place within the radio, memory 50 contains a substantial copy of the contents of memory 48. Upon receipt of a page, the paging message is transferred from the paging receiver 46, through the display controller 42 to the memory 48 and to display module memory 50. When the display module is removed from the radio, whether to read a page message or to review radio display data, switch 44 decouples the radio from the display electrically, and the display may be used to display messages or radio display data stored within the memory 50 in the display module. External controls 34, 36, 38 allow the usual display paging display operations and allow the display of radio data as well, since the radio display data has been coupled from memory 48 into memory 50.

If a page is received or if the radio display data is changed while the display module is not in the radio, the page message or the radio data, as the case may be, is stored in memory 48. Upon replacement of the display module within the radio, the updated contents of memory 48 are copied into memory 50 by the display controller 42.

While the invention has been described in terms of a preferred embodiment, modifications of the invention will occur to those skilled in the art. Accordingly, the scope of the invention is to be determined only the scope of the attached claims.

What is claimed is:

1. An electronic device including a paging receiver for receiving messages and a display module electrically coupled to said electronic device, said electronic device comprising:
    memory means disposed in the display module for storing therein said received messages when the display module is electrically coupled to the electronic device;
    means for electrically decoupling the display module from the electronic device; and
    means disposed in the display module for operating the display module to display the stored messages of the memory means when electrically decoupled from the electronic device, such that the display module may be utilized to display received messages when electrically disconnected from the electronic device.

2. An electronic device as set forth in claim 1 wherein the electronic device comprises a radio receiver.

3. An electronic device as set forth in claim 1 wherein the electronic device comprises a radio transceiver.

4. An electronic device as set forth in claim 1 including an enclosure for containing the paging receiver; and magnetic mounting means disposed on said enclosure; and wherein the display module includes means for magnetically mounting itself to the magnetic mounting means of said enclosure.

5. A paging receiver for receiving messages comprising:
    display means electrically attachable to said paging receiver for displaying a received message;
    memory means disposed in said display means for storing said received messages when the display means is electrically attached to the paging receiver.
    means for electrically detaching said display means from said paging receiver; and
    means disposed in said display means for operating said display means in said electrically detached state to display the stored messages of said memory means, thereby rendering the display means operational upon electrically disconnecting said display means from said paging receiver.

6. The paging receiver of claim 5 including an enclosure for containing the paging receiver, and magnetic mounting means disposed on said enclosure; and wherein said electrically detaching means comprises a plurality of magnets and contacts to securely hold said display means to the magnetic mounting means of said enclosure and make electrical contact with the paging receiver.

7. The paging receiver of claim 5 wherein said operating means includes:
    a plurality of controls to selectively display one of the messages of the memory means on said display means.

8. The paging receiver of claim 7 wherein said operating means further includes:
    a power source for supplying energy to said memory means, said display means, and to said controls.

9. The paging receiver of claim 8 wherein said power source is rechargeable.

10. The paging receiver of claim 5 comprising:
    a second memory means for storing received messages, and means for updating said memory means of said display means with said stored messages of said second memory means when said detachable display means is electrically reattached to the paging receiver.

* * * * *